United States Patent [19]

Fey et al.

[11] 4,160,867

[45] Jul. 10, 1979

[54] METHOD AND APPARATUS FOR MELTING MACHINING CHIPS

[75] Inventors: Maurice G. Fey, Plum Borough; Francis J. Harvey, II, Murrysville, both of Pa.

[73] Assignee: Westinghouse Electric Corp., Pittsburgh, Pa.

[21] Appl. No.: 797,893

[22] Filed: May 17, 1977

[51] Int. Cl.² ........................... H05B 7/00; F27D 3/00
[52] U.S. Cl. ........................................... 13/2 P; 13/33
[58] Field of Search .................... 13/2 P, 9 R, 2, 33

[56] References Cited

U.S. PATENT DOCUMENTS 4,006,284 2/1977 Segsworth et al. ................. 13/9 R Primary Examiner—R. N. Envall, Jr.
Attorney, Agent, or Firm—L. P. Johns

[57] ABSTRACT

A method and apparatus for melting metal chips characterized by a preheating zone, a pre-reducer zone, and a melting zone in conjunction with an arc heater through which a reducing or inert gas atmosphere is introduced into the communicating zones, whereby metal chips entering the preheating zone move through the preheating, pre-reducing and melting zones in counterflow to the reducing or inert gas movement.

5 Claims, 3 Drawing Figures

METHOD AND APPARATUS FOR MELTING MACHINING CHIPS

BACKGROUND OF THE INVENTION

1. Field of the Invention

This invention relates to a method and apparatus for melting metallic machining chips and, more particularly, it pertains to the use of electric arc heaters for that purpose.

2. Description of the Prior Art

In the metal processing industry, the melting of machining chips presents a problem. Machining chips are produced in substantial quantities in manufacturing finished goods, particularly from foundry castings. A primary cause for the difficulty encountered in melting the chips is because they oxidize prior to melting which results in high metal losses. Typical industrial practice employs gas-fired furnaces for aluminum and coke-fired cupolas for cast iron. Induction type furnaces are also used for both metals. The oxidation problem exists in all such state-of-the-art technologies due to reactions between the metal and the products of combustion, or from ambient air diffusion in the induction furnace case. Moreover, the problem is particularly troublesome because of the substantial surface area to volume ratio which is characteristic for machining chips.

SUMMARY OF THE INVENTION

In accordance with this invention, it has been found that the foregoing problem may be handled by providing a melting system comprising interconnecting zones for preheating, pre-reducing, and melting metal chips as they move through the system in a continuous manner. For that purpose, the preferred method and apparatus is characterized by a preheating chamber in which metallic machining chip stock is introduced at an inlet and moves over an inclined surface to an outlet from where the preheated chips then enter a pre-reducing chamber in which they freely fall into a melting chamber where heat for the melting is provided by an elongated arc stream which is comprised of reducing gas and an electric arc emanating from an electric arc heater, from where the gas moves through the melting, pre-reducing, and preheating chambers, respectively, in counterflow to the movement of the metallic machining chips.

The foregoing method and apparatus is applicable to chips which are covered with a surface compound such as oxide. In the case that the chips are not covered with reducible surface compounds or it is not desirable to reduce said compound then the pre-reducing chamber can be eliminated from the aforementioned apparatus and the gas atmosphere of the process can be inert.

The advantage of the method and apparatus of this invention is that it provides for a controlled gas atmosphere in which metallic machining chips are melted in such a way that they are not oxidized and, further, if a reducible surface compound, such as an oxide, is present on the surface of the chips, the compound will be reduced.

DESCRIPTION OF THE PREFERRED EMBODIMENT

In accordance with this invention, the process provides for the melting of metallic particles such as machining chips and comprises in particular the steps of introducing metal chips into a preheating chamber through a counterflowing atmosphere of reducing gases to preheat the chips, moving the preheated chips into a pre-reducing chamber through a counterflowing atmosphere of the reducing gases to eliminate any surface compounds thereon, collecting the metal chips from the pre-reducing chamber in a melting chamber, providing arc heater means for applying heat to the melting chamber at a temperature above the melting point of the metal chips whereby reducing gases passing through the arc heater pass through the melting, pre-reducing, and preheating chambers respectively, in counterflow to the movement of the metal chips.

An optional means to the foregoing process and apparatus is to eliminate the pre-reducing chamber in which case a neutral gas is used in the process and consequently, any surface compounds that are present on the surface of the chip will be reduced.

Figure 1:
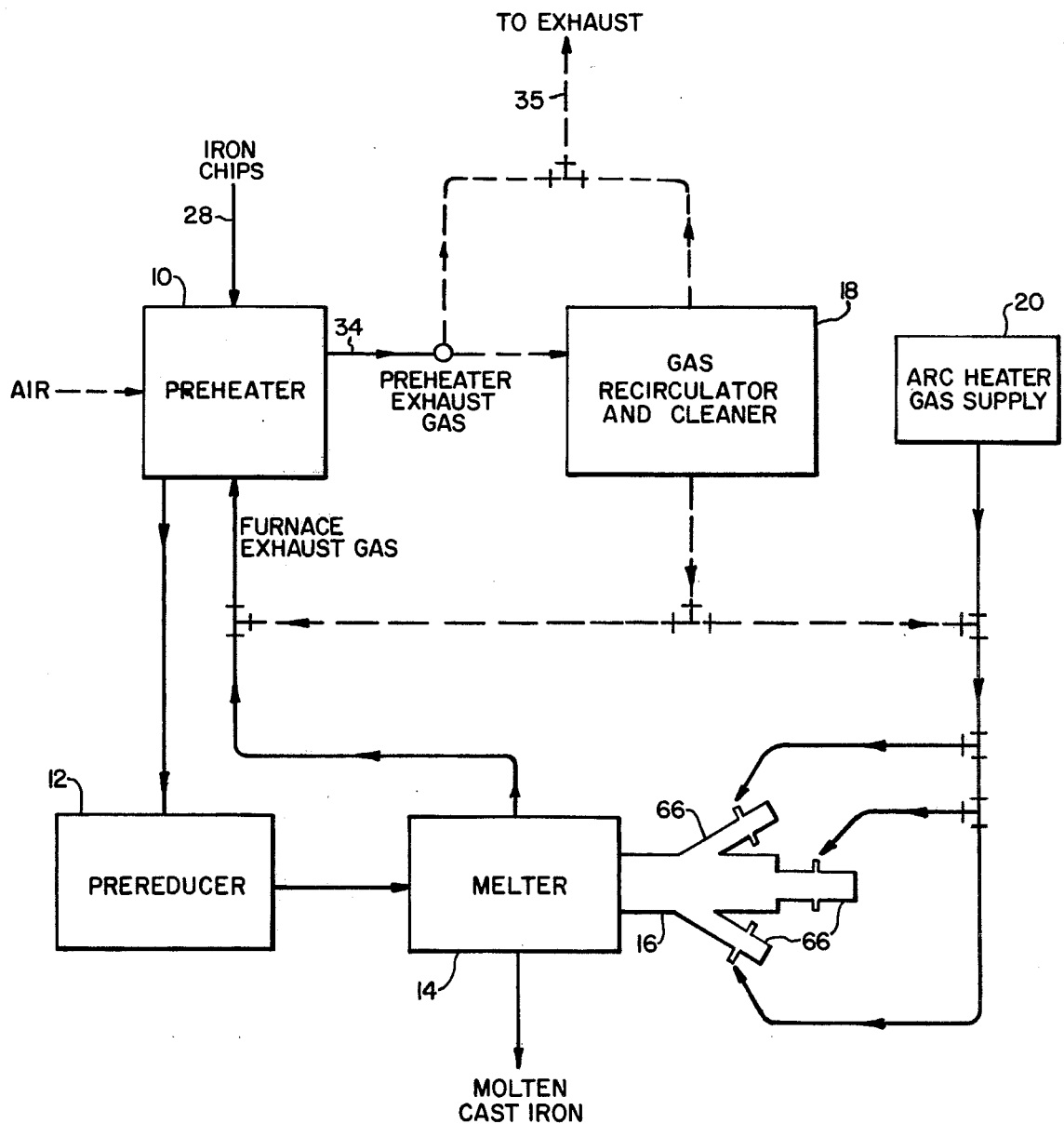
FIG. 1 is a schematic flow diagram of the apparatus of this invention.
Figure 3:
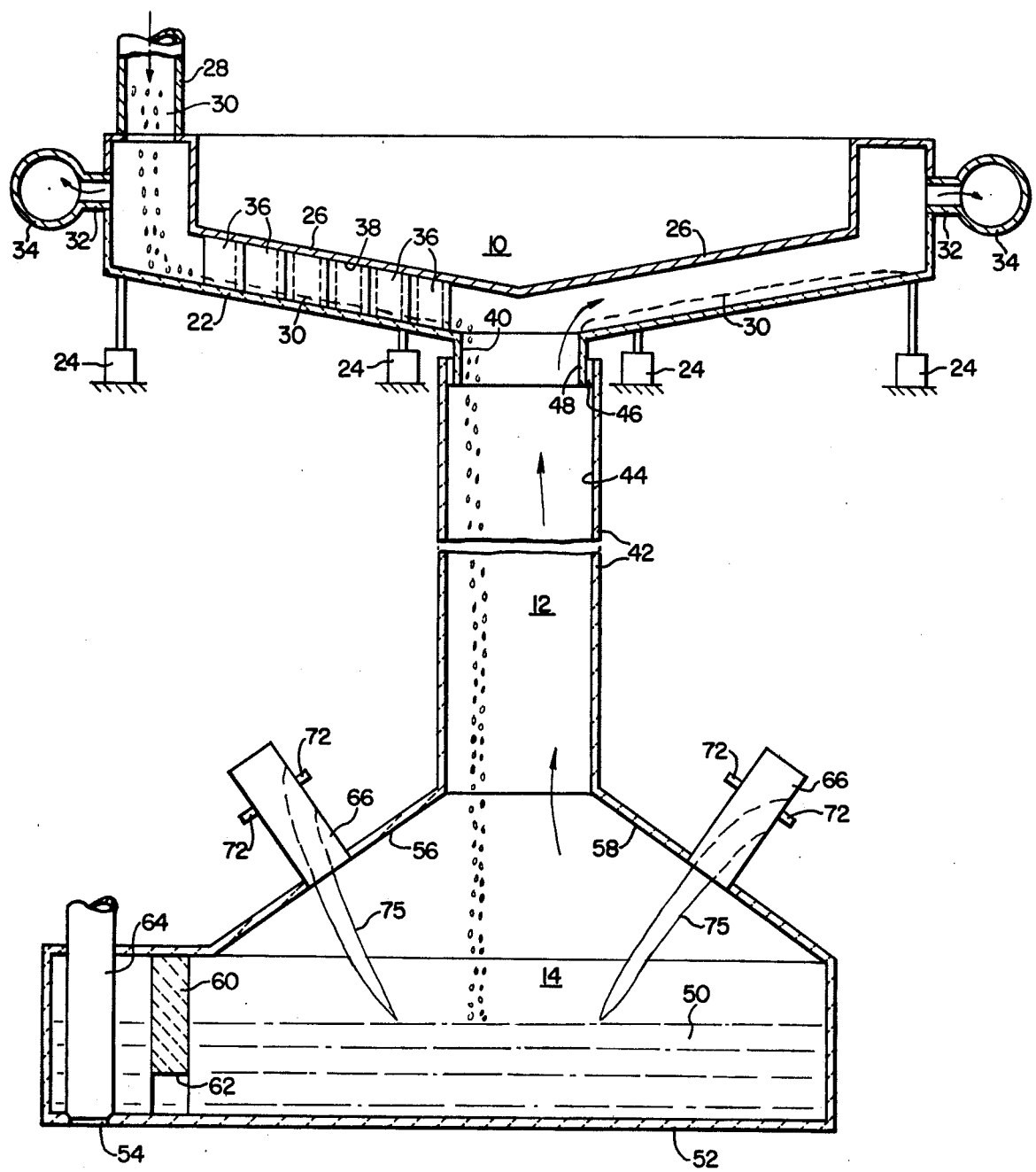
FIG. 3 is a vertical sectional view of the remelting structure of this invention.

The apparatus, by which the process of this invention is preferably performed is shown in FIGS. 1 and 3. Generally the apparatus comprises a preheater 10, a pre-reducer 12, a melter 14 having an arc heater structure 16, a gas recirculator 18, and a gas source 20 for the arc heater. As shown more particularly in FIG. 3, the preheater 10 is a rotatable member having an inwardly inclined hearth 22. The preheater 10 is rotated by means, not shown, and is supported on suitable means such as rollers 24 in a conventional manner. A cover 26 is disposed above and spaced from the hearth 22 in fixed position and does not rotate with the hearth.

An inlet 28 for particles 30 of metallic machining chips is provided at the top outer periphery of the preheater 10. Spaced outlet means such as outlets 32 are provided around the periphery of the hearth and communicate with a peripheral conduit 34 for conducting the gas from the hearth.

A plurality of baffles 36 disposed at an angle to the direction of rotation extend from and are attached to the cover 26 into a preheating chamber 38. The lower ends of each baffle 36 are spaced above the hearth 22 so that as the hearth rotates, the particles 30 of chips are moved radially inwardly from the peripheral portion of the hearth to the center where an outlet 40 for the hearth is provided. Accordingly, the preheater 10 functions to preheat solid particles 30 of metallic machining chips as they move over the inclined hearth 22 from the outer periphery to the center thereof in countercurrent flow to upwardly rising gases as described hereinbelow. In addition, the preheater 10 functions to gasify any hydrocarbons such as machining oil on the chips which mix with the reducing gases such as carbon monoxide and hydrogen.

The pre-reducer 12 comprises a vertical tubular column 42 enclosing a pre-reducer chamber 44 extending from the preheating chamber 38 to the melter 14. The upper end of the column 42 includes sealing means such as a gasket 46 to provide a gas tight joint between the column and a collar 48 of the hearth 22.

The melter 14 is a receptacle for containing liquid metal 50 resulting from melting and accumulation of the particles 30 of chips. The melter housing comprises a bottom wall 52 having a tap hole 54 as well as upwardly inclined walls 56, 58, the upper ends of which are secured in a suitable manner to the lower end of the column 42.

As shown in FIG. 3, a baffle 60 extends from the upper part of the housing in a space from the bottom wall 52 to provide a communication opening 62 between opposite sides of the baffle. A stopper rod 64 functions in cooperation with the tap hole 54 in the usual manner.

The arc heater structure 16 comprises at least one arc heater 66 which is shown schematically in FIG. 1. In accordance with this invention, the arc heater 66 is operated at a temperature above the melting point of the particles 30 of metal chips. Thus the operating temperature ranges from about 3000° F. to about 10,000° F. A suitable arc heater for use herein is that disclosed in U.S. Pat. No. 3,832,519, issued Aug. 27, 1974, entitled "Arc Heater With Integral Fluid And Electrical Duct And Quick Disconnect Facility", of which the inventors are Charles B. Wolf, Maurice G. Fey, and Frederick A. Azinger, Jr. Because of the full disclosure in that patent, the description of the arc heater 66 is limited herein to the basic structure and operation. The arc heater 66 is a single phase, self-stabilizing AC device capable of power levels up to about 3500 kilowatts or up to 10,000 kilowatts for a three-phase plant installation. For the practice of this invention, it if preferred that three arc heaters be provided, one for each of the three phases of the AC power supply.

Figure 2:
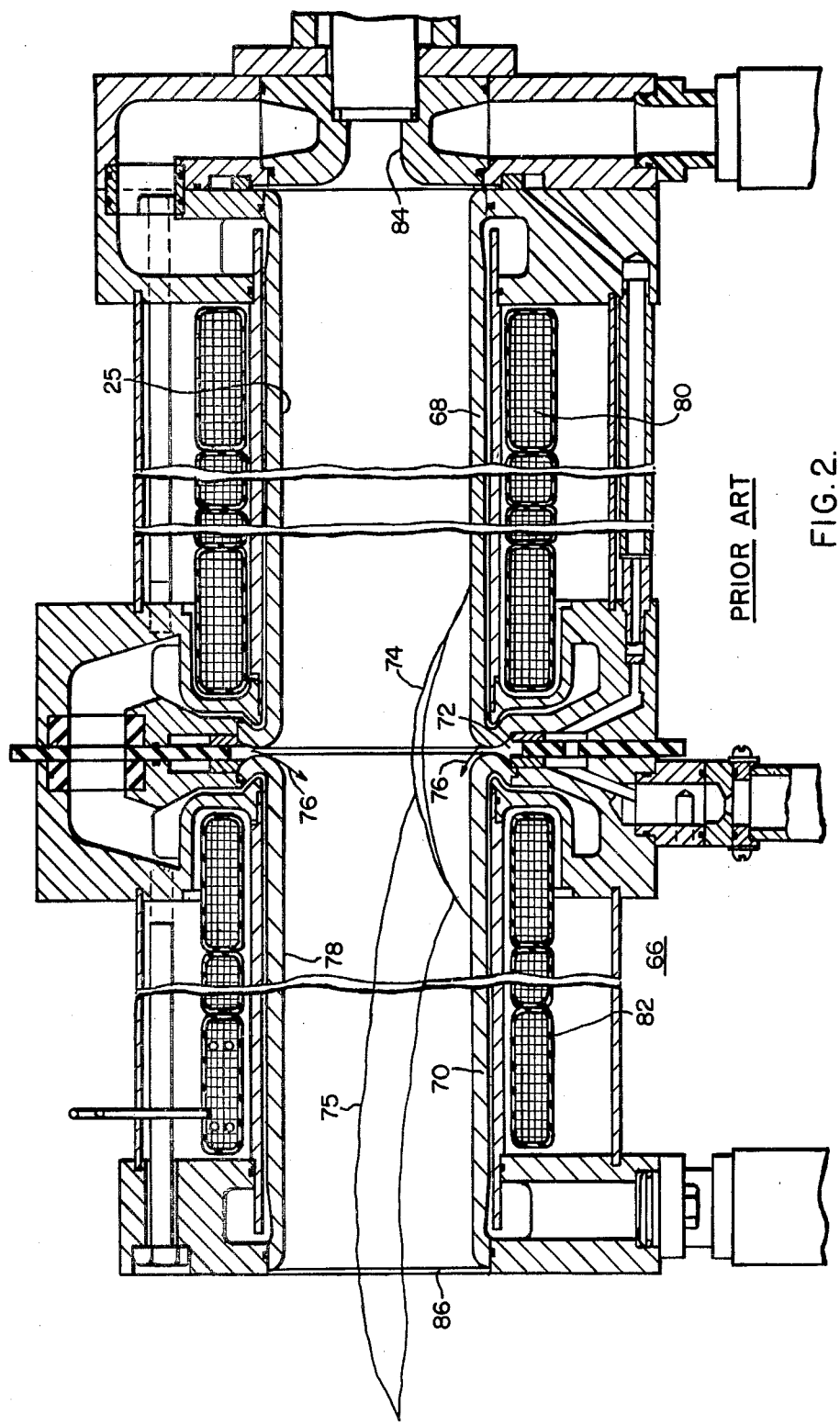
FIG. 2 is a sectional view of an arc heater.

As shown in FIG. 2 an arc heater generally indicated at 66 is part of the arc heater structure 16. The arc heater 66 includes two annular copper electrodes 68, 70 which are spaced at 72 about 1 millimeter to accommodate the line frequency power source of 4 kV. An arc 74 is initiated in the space or gap 72 and incoming feed stock gas, indicated by the arrow 76, is introduced through the space 72 into an arc chamber 78 within the interior of arc heater 13. The arc 74 rotates at a speed of about 100,000 rpm by interaction of the arc current (several thousand amps AC) with a DC magnetic field set up by internally mounted solenoid coils 80, 82. The velocities yield a very high operating efficiency for equipment of this type. In addition to the feed stock gas 76, a secondary feed stock gas can be introduced at an upstream inlet 84, or axially into the chamber 78. Exit enthalpies ranging from, for example, up to about 15,000 BTU per pound when operated on carbon monoxide and hydrogen gas mixtures are easily obtained at good thermal efficiencies at the exit end 86 of the arc heater. The feed stock gas 76 introduced at the gap 72 and inlet 84 is a reducing or inert gas, such as carbon monoxide, hydrogen, nitrogen, argon, helium, and mixtures thereof.

In operation, the arc heaters 66 provide an elongated arc stream 75 which extends through the exit end 86 of the arc heater into the melting chamber of the melter 14. The arc stream 75 comprises a mixture of the extended electric arc 74 as well as the reducing or inert gases introduced into the arc heater. The arc streams 75 are directed toward the metal bath 50 to supply heat of fusion to maintain the metal bath 50. From time to time, the liquid metal 50 is drained from the melter 14 through the tap hole 45.

The hot gases emanating from the arc streams 75 leave the melting chamber through the pre-reducing chamber 44 through which the chips 30 are falling and are thus heated and reduced. The pre-reducer chamber 44 is illustrative only and several other types may be employed such as a packed bed, rotary kiln on a rotary hearth. The countercurrent flows of the hot gases and the falling chips occurs in the pre-reducer chamber 44 as well as the preheating chamber 38, thereby providing excellent heat transfer functions.

The particular preheater 10 disclosed herein is for illustrative purposes so that several types of preheaters are possible, including packed beds, fluidized beds, rotary kilns. The particles 30 of metal chips are introduced to the preheater by means of a lock hopper (not shown) and travel through the preheater until they drop through the pre-reducer 12 into the melter 14.

Upon leaving the preheater 10 through the conduit 34, the gases are cleaned and recirculated via the gas recirculator 18. Part of the recirculated gases may be exhausted at 35 in order to maintain overall mass balance. Makeup gas is also supplied as the gases are recirculated to the arc heaters 66. To prevent the formation of oxide on the surfaces of the chipped particles and to reduce any surface compounds that may exist on the chip surfaces, the gas mixture is controlled to the requied composition during the counterflow between the gases and the chips in the melter, pre-reducer and preheater chambers. Indeed, an important advantage is obtained in the use of arc heaters of the type of arc heater 66 disclosed herein, primarily because the source of heat, electricity does not introduce a by-product gas into the system.

Where the surface of the chips is covered with machining oil, or the chips are premixed with a hydrocarbon source, such as coal, the hydrocarbon is gasified in the preheater and the dissociation products are primarily carbon monoxide and hydrogen in accordance with one or a combination of the following reactions:

$$C_xH_y + O_2 \rightarrow CO + H_2 \tag{1}$$

$$C_xH_y + CO_2 \rightarrow CO + H_2 \tag{2}$$

$$C_xH_y + H_2O \rightarrow CO + H_2 \tag{3}$$

$$C_xH_y + O_2 + N_2 \rightarrow CO + H_2 + N_2, \tag{4}$$

where: $C_xH_y$ is the hydrocarbon source such as machine oil or coal, and $O_2$ and $N_2$ is air.

This gas mixture is then recycled into the arc heaters 66 and provides an excellent heat transfer medium due to the high specific heat and thermal conductivity of hydrogen. The gas mixture also serves as a source of reductant for the elimination of the oxide layer on the surface of the chips. It is pointed out that oxygen enters the system from various sources including oxide layers on the chips, entrained air in the incoming chips, and air diffusion through leaks. Such oxygen reacts with carbon and hydrogen in the oil. It is recognized that additional oxygen in the form of oxygen, air, or steam may be required to satisfy the material balance. It is also recognized that gas is vented in proportion to the oil and gas which enters the system.

Finally, the process and apparatus of this invention may be used to remelt a broad range of metals including aluminum, steel, cast iron, superalloys, brass, bronze, and copper. Because of the difference in properties of some of these metals or alloys, the design detail of the particular reducer, preheater, or melter may vary including refractories for lining the furnace and the preheater. Accordingly, the process and apparatus of this invention provides for the melting of metallic machining chips and involves the use of electric arc heaters which have significant advantages over the existing technology for melting such chips.

What is claimed is:

1. Apparatus for melting metal chips comprising:
   (a) a preheating chamber comprising a hearth having a substantially planar surface and being rotatable about a central vertical axis, inlet means for metal chip stock adjacent to one surface portion of the hearth, outlet means for preheated metal chip stock adjacent to another surface portion of the hearth, means for moving the metal chip stock from the inlet means to the outlet means,
   (b) a pre-reducing chamber communicating with said outlet means,
   (c) a melting chamber communicating with the preheating chamber,
   (d) an arc heater having axially spaced, generally hollow, cylindrical electrodes forming an arc chamber communicating with the melting chamber,
   (e) electric means for striking an electric arc in an axial gap between the electrodes,
   (f) means for rotating the arc within the arc chamber,
   (g) means for blowing non-oxidizing gas through the gap to form an elongated arc stream comprising the non-oxidizing gas and the arc, and
   (h) the non-oxidizing gas flowing through the melting chamber, the pre-reducing chamber and the preheating chamber in countercurrent to the movement of metal chips through said chamber.

2. Apparatus of claim 1 in which the non-oxidizing gas consists of gases selected from the group consisting of carbon monoxide, hydrocarbons, hydrogen, nitrogen, argon, helium, and mixtures thereof.

3. Apparatus of claim 2 in which the preheating chamber comprises metal chip stock inlet and outlet means and an inclined surface extending between said means.

4. Apparatus of claim 3 in which the pre-reducing chamber is contained within a vertical tubular surface the upper end of which communicates with the preheating chamber and the lower end of which communicates with the melting chamber.

5. Apparatus of claim 4 comprising conduit means for recirculating the gases from the preheating chamber to the arc heater.

* * * * *